Jan. 30, 1951     L. M. HEADLEY     2,539,578
BEARING TEST APPARATUS
Filed Dec. 13, 1945
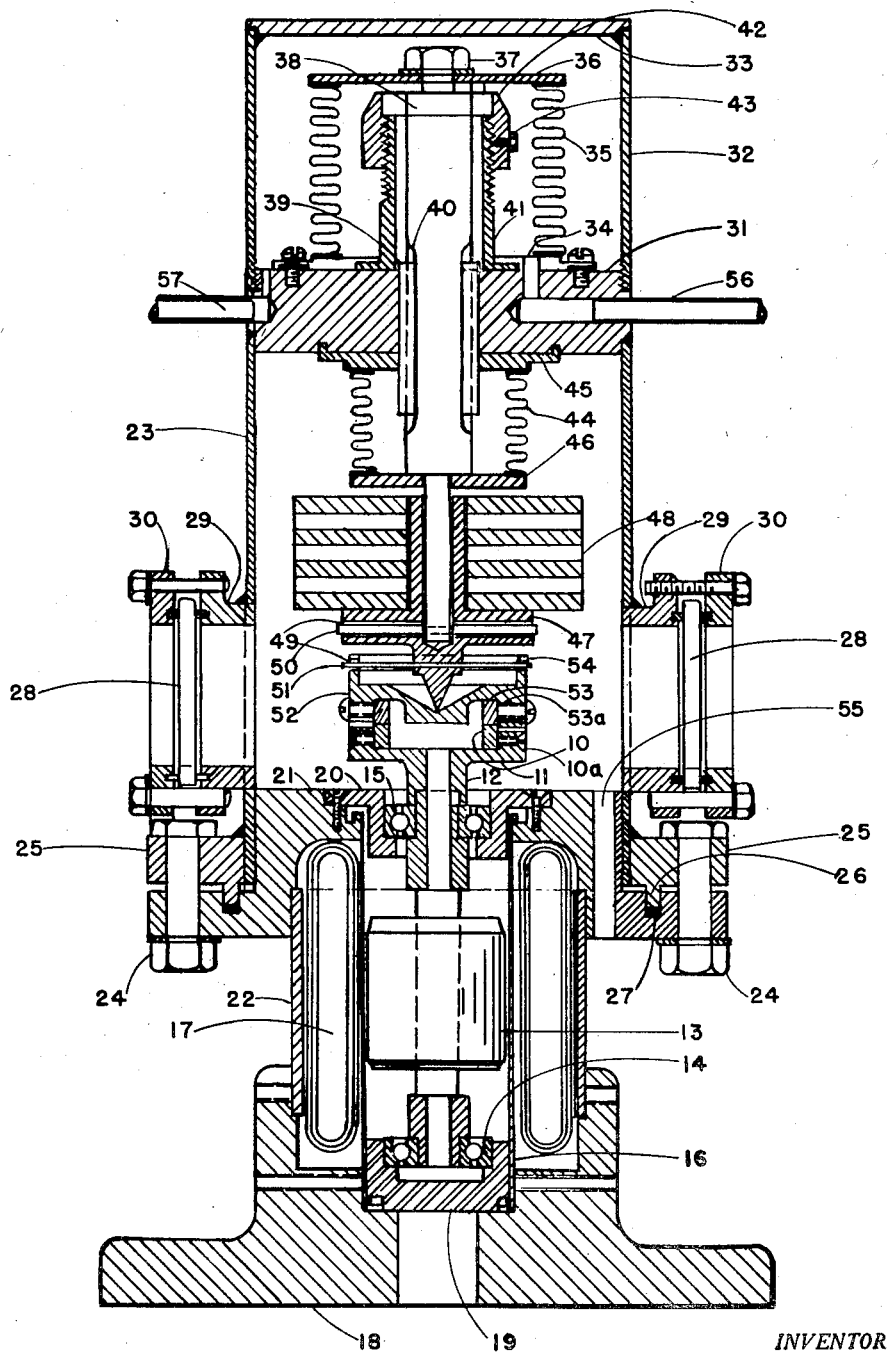
INVENTOR.
LEWIS M. HEADLEY.
BY
ATTORNEY.

Patented Jan. 30, 1951

2,539,578

UNITED STATES PATENT OFFICE 2,539,578

BEARING TEST APPARATUS

Lewis M. Headley, New York, N. Y., assignor to the United States of America as represented by the United States Atomic Energy Commission Application December 13, 1945, Serial No. 634,868

7 Claims. (Cl. 73—7)

This invention relates to a bearing tester and more particularly to an apparatus for testing and visually observing the performance of thrust bearings under variable conditions of pressure and corrosion.

With introduction in the trade of motors and bearing surfaces to be used in contact with corrosive gases, it is important that their durability be tested in order to determine whether or not they will stand up under conditions of use. Particularly is this true in those circumstances wherein thrust bearings are run continuously under considerable load and in a corrosive atmosphere.

Accordingly, an object of this invention is to provide an improved and useful testing apparatus for thrust bearings.

It is another object of this invention to provide an improved apparatus for visually observing the performance of bearing surfaces under conditions of use as with corrosive gases.

It is a further object of this invention to provide an improved simple testing device where the performance of bearing surfaces can be observed under variable pressures.

Further objects advantages, modifications, and adaptations will be apparent in the following description taken with reference to the accompanying drawing wherein the apparatus is enclosed in a fluid tight cylinder containing a window through which may be viewed a thrust bearing mounted on a non-rotatable platform carrying a weight augmented by variable pressure means to force the non-rotatable bearing against a rotatable bearing in an atmosphere of predetermined nature.

Referring to the drawing there is illustrated a rotatable bearing 10 mounted and retained by suitable clamping means as set screws 10a in support 11 on shaft 12 of electric motor rotor 13. The shaft 12 carrying electric rotor 13 is supported at its lower end by conventional ball bearing arrangement 14 and at its upper end in conventional ball bearing arrangement 15. About the rotor 13 is a thin cylinder 16 which protects stator winding 17 from exposure to corrosive gases which may be used during testing operation. A base support 18 serves as a mounting for the lower bearing housing 14 which is seated in the bearing support 19. The thin-walled cylinder 16 is sealed about the bearing housing 14 with the opposite end of the cylinder sealed to a bearing mount 20. The mount 20 in turn serves as a support for bearing housing 15 seated in a central opening through the base plate 21 which is supported by the motor cylinder wall 22.

Resting upon and sealed to the base plate 21 is a second fluid tight cylinder 23 secured by a plurality of suitable nut and bolt means 24 which clamp the flange 25, welded on cylinder 23, in fluid tight relationship by insertion of tongue 26 in groove 27 containing a suitable sealing gasket as tin or the like. On opposite sides and at the lower end of cylinder 23 are transparent windows 28 clamped, in fluid tight relationship to the rings 29 welded to cylinder 23, by means of outer ring plates 30 secured with suitable gasket means clamped against both sides of the windows by suitable bolt means.

Welded to the top of the cylinder 23 is a second plate member 31 which is threaded and suitably gasketed to receive in a fluid tight joint, a third fluid tight cylinder 32 closed by top 33 which may be integral with the cylinder wall or welded as shown. Attached to and supported by the plate member 31 is the base 34 of bellows 35 closed at its opposite end by plate 36 to form a fluid tight expansible chamber within the fluid tight cylinder 32. Supported from plate 36 by suitable gasket and nut means 37 is a cylindrical shaft 38 partly within the bellows 35 and extending through plate member 31 into the bearing testing chamber enclosed by cylinder wall 23. The nut 37 is threaded on a portion of the shaft 38 against a gasket serving to seal the opening in plate 36 through which the threaded shaft portion extends. One or more key members 39 are fixed in the central opening in plate 31 and ride in grooves 40 on the shaft 38 to permit longitudinal movement without rotation of the shaft 38. Within the bellows 35 is a cylinder 41 secured in place on plate 31 by base 34 which overlaps a flange about the base of cylinder 41. By this means the bellows 35 and cylinder 41 may be easily separated to provide access to the adjustable threaded collar 42 on cylinder 41 to which the collar may be locked in a set position by set screw 43. This adjustable collar 42 and the top member 33 serve to limit the longitudinal movement of shaft 38. Thus, upward motion is halted when the nut 37, or the end of the shaft on which it is threaded, comes in contact with member 33 and downward motion is halted when the bellows plate 36 comes in contact with the collar 42.

Dependent from the plate member 31 and enclosing a portion of the shaft 38 is a secondary bellows 44 soldered at one end to plate 45 which is welded or soldered to the under side of plate member 31. The opposite end of the bellows 44 is soldered to plate 46 through which a reduced portion of the shaft 38 extends. The plate 46 is welded or soldered to the shoulder formed where the diameter of shaft 38 is reduced.

Mounted on the base of shaft 38 is a platform 47 carrying a number of replaceable weights 48. The platform 47 has an opening 49 in alignment with a smaller opening through the bottom end of shaft 38. A key 50 is fitted through these openings to secure the platform 48 to the cylindrical shaft 38. The key 50 fits loosely in the opening 49 to permit a small amount of axial movement while it prevents the rotation of the platform 47. Likewise suspended from the base of weight carrying platform 47 by means of the pin 51 is the bearing holder 52 for thrust bearing 53, which is to be tested. The test bearing is secured to the holder 52 by suitable means, such as the set screws 53a. The pin 51 extends through the enlarged or oversize openings 54 in the top portion of bearing holder 52 and through the smaller opening in the base of the platform 47. As shown, the base of the platform 47 is pointed in order to apply pressure at the apex of a conical recess in the top surface of the bearing holder and thereby distribute the pressure uniformly on the bearing surfaces. Within the base plate 21 is fluid passageway 55 through which a desired gaseous atmosphere is introduced into the cylinder chamber 23 to envelop the testing portion of the apparatus. This gaseous atmosphere may of course be of a character detrimental to the bearing surfaces such as, for example, uranium hexafluoride or may be of other gases more or less corrosive to the bearing surfaces.

Likewise in the plate member 31 is fluid passageway 56 extending into the interior of bellows 35. Through this passageway a fluid under pressure may be supplied within the bellows 35 to lift the weighted platform 47. Preferably, however, this passage is used to evacuate the bellows 35 and 44 so that the pressure of fluid supplied through passageway 57 into the enclosure surrounding bellows 35 is exerted on bellows 35 to increase the pressure against the face of the bearings through shaft 38 and bearing holder 52.

When the pressure fluid is balanced between the interior of bellows 35 and the interior of the cylinder 32 surrounding it, the weighted platform 47 normally rests upon bearing holder 52 by reason of the play allowed in the oversize openings 49 and 54. This provides a uniform standard test condition by the use of weights alone, but this may be adjusted by additional pressure or reduced pressure by manipulation of the pressure differential across the bellows 35.

The gaseous atmosphere introduced into the cylinder 23 is not intended to affect the operation of bellows 44 whose function is primarily to provide a fluid tight closure about shaft 38. The pressure effect of the gaseous atmosphere on the bellows 44 may be offset by adjusting the pressure in the larger bellows 35.

To illustrate the operation of this apparatus the bolt and nut means 24 are unscrewed and the top cylinders 23 and 32 are lifted off to insert suitable bearings in the bearing holders 11 and 53. Then the cylinders are replaced and sealed. The pressures are equalized between the interior of diaphragm bellows 35 and 44 and the pressure cylinder 32. This permits the weighted platform 47 to rest at its pointed end in the conical recess at the top of bearing holder 52. Thereby a constant dead-weight pressure is applied on the bearing surfaces and this pressure may be increased or decreased by manipulating the pressure differential between the diaphragm bellows 35 and the top pressure chamber 32. For example, in order to increase the force applied to the bearing holder 52 through shaft 38, the bellows is deflated by evacuating through conduit 56 while increasing the pressure about the bellows 35 at the same time through passageway 57. Conversely, exhausting the interior of cylinder 32 through conduit 57 will cause an expansion of the bellows 35 which may be augmented by increasing the pressure within the bellows through conduit 56 to lift the weights. This decreases the force applied on the bearing surfaces. In order to vary the conditions in the atmosphere about the bearing surfaces, corrosive gas as uranium hexafluoride or other corrosive or non-corrosive gas or gases may be introduced through conduit 55 about the testing portion of the apparatus in cylinder 23. After the rotor 13 is rotated by energizing the fields 17, the performance of the bearing surface or surfaces under the conditions maintained may be observed through viewing window 28.

From the above description it is apparent that the present invention comprises a compact and efficient structure for testing the wearing properties of metals under controlled conditions of pressure and corrosiveness. The apparatus has been found particularly useful in testing the load-carrying capacity of thrust bearings and observing their reaction under conditions simulating actual use.

Since many embodiments might be made of the present invention and since many changes might be made in the embodiment described, it is to be understood that the foregoing description is to be interpreted as illustrative only and not in a limiting sense.

I claim:

1. Apparatus for testing the performance of a bearing in a predetermined atmosphere comprising, in combination, a leak-tight enclosure, a non-rotatable bearing holder within said enclosure for supporting the non-rotatable portion of said test bearing, a rotatable bearing holder within said enclosure for supporting the rotatable portion of said test bearing, means for introducing a predetermined atmosphere into said enclosure about said bearing holders, a weighted support contained within said enclosure bearing against one of said bearing holders to urge the opposing surfaces of said test bearing into contact with each other, a fluid-pressure transmitter within said enclosure comprising a bellows linked to said support to move it in response to expansion and contraction of said bellows, a fluid passage communicating with the interior of said bellows for adjusting the fluid pressure therewithin and means for rotating said rotatable bearing holder.

2. Apparatus for testing the performance of a bearing in a predetermined atmosphere comprising a leak-tight enclosure, a non-rotatable bearing holder within said enclosure for supporting the non-rotatable portion of said test bearing, a rotatable bearing holder within said enclosure for supporting the rotatable portion of said test bearing, means for introducing a predetermined atmosphere into said enclosure about said bearing holders, a non-rotatable weighted support contained within said enclosure bearing against said non-rotatable holder to urge the opposing surfaces of said test bearing into contact with each other, a fluid-pressure transmitter in said enclosure comprising a bellows linked to said support to move it toward and away from said non-rotatable holder in response to contraction and expansion of said bellows, a fluid passage communicating with the interior of said bellows for adjusting the fluid pressure therewithin and means for rotating said rotatable bearing holder.

3. Apparatus for testing the performance of a bearing in a predetermined atmosphere comprising a leak-tight enclosure, means within said enclosure forming a leak-tight compartment within said enclosure, a rotatable bearing holder within said compartment for supporting the rotatable portion of said test bearing, a non-rotatable bearing holder within said compartment for supporting the non-rotatable portion of said test bearing, a fluid passage communicating with said compartment for introducing a predetermined atmosphere into said compartment, a weighted support partly within said compartment and bearing against said non-rotatable bearing holder to urge the opposing surfaces of said bearing into contact, a fluid-pressure transmitter within said enclosure comprising a bellows linked to and enclosing the portion of said support not within said compartment to move said support in response to expansion and contraction of said bellows, a fluid passage communicating within the interior of said bellows for adjusting the fluid pressure therewithin and means for rotating said rotatable bearing holder.

4. Apparatus for testing the performance of a bearing in a predetermined atmosphere comprising a leak-tight enclosure, a non-rotatable bearing holder within the central portion of said enclosure for supporting the non-rotatable portion of said test bearing, a rotatable bearing holder in said central portion below said non-rotatable holder for supporting the rotatable portion of said test bearing, means for introducing a predetermined atmosphere into said central portion, a weighted, vertically movable non-rotatable support within said enclosure bearing downward against said non-rotatable bearing holder to urge the opposing surfaces of said test bearing into contact, a fluid-pressure transmitter within said enclosure sealed to said support to move said support in response to expansion and contraction of said bellows, a fluid passage communicating with the interior of said bellows for adjusting the fluid-pressure therewithin and means in the lower part of said enclosure for rotating said rotatable bearing holder.

5. Apparatus for testing the performance of a bearing in a predetermined atmosphere comprising a leak-tight enclosure, separating means dividing said enclosure into three mutually gas-tight compartments including a compartment centrally located between the other two said compartments, a non-rotatable bearing holder within said central compartment for supporting the non-rotatable portion of said test bearing, a rotatable bearing holder within said central compartment for supporting the rotatable portion of said test bearing, means for introducing a predetermined atmosphere into said central compartment, a weighted vertical shaft-like support partly within said central compartment bearing against said non-rotatable bearing holder to urge it toward said rotatable holder, a fluid-pressure transmitter in the compartment above said central compartment comprising a bellows sealed to said support and to the separating means between said upper and said central compartment, a fluid passage communicating within the interior of said bellows for adjusting the fluid pressure therewithin and means in the lowest of said compartments for rotating said rotatable holder.

6. Apparatus for testing the performance of a bearing in a predetermined atmosphere comprising a leak-tight enclosure, separating means dividing said enclosure into three mutually gas-tight compartments including a compartment centrally located between the other two said compartments, a non-rotatable bearing holder within said central compartment for supporting the non-rotatable portion of said test bearing, a rotatable bearing holder within said central compartment for supporting the rotatable portion of said test bearing, a gas-tight window in said central compartment for viewing the performance of said test bearing, means for introducing a gas into said central compartment, a weighted vertical shaft-like support partly within said central compartment bearing against said non-rotatable bearing holder to urge it toward said rotatable holder, a fluid-pressure transmitter in the compartment above said central compartment comprising a bellows sealed to said support and to the separating means between said upper and said central compartment, a fluid passage communicating with the interior of said bellows for adjusting the fluid pressure therewithin and means for rotating said rotatable holder in the lowest of said compartments.

7. Apparatus for testing a bearing surface in a predetermined atmosphere comprising, in combination, a generally cylindrical enclosure, separating means dividing said enclosure into three mutually gas-tight compartments including a compartment centrally located between the other two of said compartments, a bearing test mount in said central compartment, an expansible bellows within a second of said compartments sealed to one of said separating means, a fluid passageway communicating with the interior of said bellows for adjusting the pressure therewithin, a second fluid passageway communicating with said second compartment for adjusting the pressure therewithin whereby the difference in pressure between the interior of said bellows and the compartment surrounding said bellows determines the relative expansion of the bellows, a weighted axially non-rotatable shaft partially within said bellows and secured thereto for movement in reponse to the expansion and contraction of said bellows, said shaft extending through and sealed to the separating means sealed to said bellows, a non-rotatable bearing holder carried loosely at the end of said shaft opposite said bellows, said shaft bearing against said non-rotatable holder, and a rotatable bearing member for supporting a portion of the test bearing in contact with the non-rotatable portion of the test bearing and means for rotating said rotatable bearing member.

LEWIS M. HEADLEY.

REFERENCES CITED

The following references are of record in the file of this patent:

UNITED STATES PATENTS

| Number | Name | Date |
| --- | --- | --- |
| 1,044,317 | Wendt | Nov. 12, 1912 |
| 2,033,588 | Pigott et al. | Mar. 10, 1936 |
| 2,274,541 | Fontana et al. | Feb. 24, 1942 |

FOREIGN PATENTS

| Number | Country | Date |
| --- | --- | --- |
| 772,328 | France | Aug. 13, 1934 |